United States Patent
Mirisola et al.

(10) Patent No.: US 10,445,769 B2
(45) Date of Patent: Oct. 15, 2019

(54) SYSTEMS AND METHODS FOR AUDIENCE MEASUREMENT

(71) Applicant: Google Inc., Mountain View, CA (US)

(72) Inventors: Raimundo Mirisola, Zug Zug (CH); Oliver Thomas Gaymond, Zürich (CH); Andras Orban, Zollikerberg (CH); Reto Strobl, Walenstadt (CH)

(73) Assignee: Google LLC, Mountain View, CA (US)

( * ) Notice: Subject to any disclaimer, the term of this patent is extended or adjusted under 35 U.S.C. 154(b) by 715 days.

(21) Appl. No.: 14/140,263

(22) Filed: Dec. 24, 2013

(65) Prior Publication Data

US 2015/0178769 A1    Jun. 25, 2015

(51) Int. Cl.
*G06Q 30/02* (2012.01)
*G06F 16/335* (2019.01)
*G06F 7/24* (2006.01)
*H04L 29/06* (2006.01)

(52) U.S. Cl.
CPC .......... *G06Q 30/0246* (2013.01); *G06F 7/24* (2013.01); *G06F 16/335* (2019.01); *H04L 63/0421* (2013.01); *H04L 63/0428* (2013.01); *H04L 63/104* (2013.01); *H04L 67/42* (2013.01)

(58) Field of Classification Search
None
See application file for complete search history.

(56) References Cited

U.S. PATENT DOCUMENTS

| 5,892,900 A * | 4/1999 | Ginter .................... G06Q 20/12 726/26 |
| 7,296,158 B2 | 11/2007 | Staddon et al. |
| 7,363,244 B2 | 4/2008 | Staddon et al. |

(Continued)

FOREIGN PATENT DOCUMENTS

| CN | 101449557 | 6/2009 |
| CN | 103238295 | 8/2013 |
| WO | WO-2013/033122 | 3/2013 |

OTHER PUBLICATIONS

Kerschbaum: Outsourced Private Set Intersection Using Homomorphic Encryption ASIACCS'12 (Year: 2012).*

(Continued)

*Primary Examiner* — Zeshan Qayyum
*Assistant Examiner* — Eduardo Castilho
(74) *Attorney, Agent, or Firm* — Foley & Lardner LLP

(57) ABSTRACT

To provide secure single-source panel audience measurement data while providing confidentiality and security of panel membership, an audience measurement server may capture content identifiers and client identifiers of devices receiving content. A panel provider may generate a probabilistic data structure via a hash of the client identifiers. The audience measurement server may utilize the filter array to extract a subset of measurement data including the data of the panel members, as well as data of some non-panel members as false positives, without being able to distinguish between the members and non-members. The audience measurement server may encrypt the extracted subset of data with each client identifier corresponding to an item of data as a key, and send the encrypted data to the panel provider, thus including both panel and some non-panel data, with the panel provider only able to decrypt data corresponding to its own panel members.

16 Claims, 10 Drawing Sheets

(56) References Cited

U.S. PATENT DOCUMENTS

| | | | |
|---|---|---|---|
| 7,937,428 B2* | 5/2011 | Beyer | G06F 12/0864 708/300 |
| 8,307,006 B2 | 11/2012 | Hannan et al. | |
| 8,417,966 B1* | 4/2013 | Mooneyham | H04L 9/3236 713/189 |
| 8,429,266 B2 | 4/2013 | Vanheuverzwyn et al. | |
| 8,498,995 B1* | 7/2013 | Gond | G06F 17/30424 707/713 |
| 9,305,056 B1* | 4/2016 | Gupta | G06F 17/3048 |
| 9,596,151 B2 | 3/2017 | Heffernan et al. | |
| 9,639,577 B1* | 5/2017 | Lai | G06F 16/2455 |
| 10,325,272 B2 | 6/2019 | Hunt et al. | |
| 2003/0177488 A1 | 9/2003 | Smith et al. | |
| 2004/0088212 A1 | 5/2004 | Hill | |
| 2004/0091116 A1* | 5/2004 | Staddon | G06Q 20/3829 380/277 |
| 2005/0166046 A1* | 7/2005 | Bellovin | H04L 9/3218 713/165 |
| 2005/0166053 A1* | 7/2005 | Cui | H04L 9/3239 713/176 |
| 2007/0277182 A1* | 11/2007 | Chen | H04N 7/17318 719/315 |
| 2010/0070514 A1* | 3/2010 | Woodruff | G06F 17/3089 707/754 |
| 2011/0015989 A1* | 1/2011 | Tidwell | G06Q 30/02 725/32 |
| 2011/0153391 A1 | 6/2011 | Tenbrock | |
| 2011/0224992 A1 | 9/2011 | Chaoui et al. | |
| 2011/0231264 A1 | 9/2011 | Dilling et al. | |
| 2012/0005213 A1 | 1/2012 | Hannan et al. | |
| 2012/0124161 A1 | 5/2012 | Tidwell et al. | |
| 2012/0304210 A1 | 11/2012 | Zaslavsky et al. | |
| 2012/0310729 A1 | 12/2012 | Dalto et al. | |
| 2013/0010950 A1* | 1/2013 | Kerschbaum | H04L 9/008 380/30 |
| 2013/0035979 A1 | 2/2013 | Tenbrock | |
| 2013/0173917 A1 | 7/2013 | Clifton et al. | |
| 2013/0217332 A1 | 8/2013 | Altman et al. | |
| 2013/0217333 A1 | 8/2013 | Sprigg et al. | |
| 2013/0339526 A1* | 12/2013 | Ruellan | G06F 16/9574 709/226 |
| 2014/0025684 A1* | 1/2014 | Hess | G06F 16/335 707/741 |
| 2014/0036912 A1* | 2/2014 | Hui | H04L 45/14 370/390 |
| 2014/0075018 A1 | 3/2014 | Maycotte et al. | |
| 2014/0108435 A1* | 4/2014 | Kolesnikov | G06F 7/24 707/754 |
| 2014/0337104 A1 | 11/2014 | Splaine et al. | |
| 2014/0344934 A1* | 11/2014 | Jorgensen | G06F 16/335 726/24 |
| 2015/0186403 A1 | 7/2015 | Srivastava et al. | |
| 2016/0021202 A1 | 1/2016 | Peterson et al. | |
| 2016/0203211 A1 | 7/2016 | Milton et al. | |
| 2016/0247175 A1 | 8/2016 | Milton | |
| 2017/0006342 A1 | 1/2017 | Nagaraja Rao et al. | |
| 2019/0012480 A1 | 1/2019 | Thorwirth | |

OTHER PUBLICATIONS

Dong et al. When Private Set Intersection Meets Big Data: An Efficient and Scalable Protocol CCS'13 Nov. 4-8, 2013 (Year: 2013).*

Bloom, Space/Time Trade-offs in hash coding with allowable errors, ACM, vol. 13, No. 7, Jul. 1970, pp. 422-426 (Year: 1970).*

Lall et al., The bitwise bloom filter, Univeristy of Rochester Technical report TR-2007-927, Nov. 29, 2007 (Year: 2007).*

Raykova et al., Secure anonymous database search, ACM, CCSW/09, Nov. 13, 2009 (Year: 2009).*

Dong et al., When Private set intersection meets big data: An efficient and scalable protocol, ACM CCS 2013, Nov. 4-8, 2013, pp. 789-800 (Year: 2013).*

International Search Report & Written Opinion on PCT/US2015/042778 dated Sep. 10, 2015.

International Search Report and Written Opinion on Application No. PCT/US2014/023308 dated Aug. 14, 2014.

Canadian Office Action issued on 2934852 dated Apr. 20, 2017 (4 pages).

Extended European Search report for application No. 16191495.7 dated Jan. 4, 2017 (9 pages).

International Preliminary Report on Patentability for application No. PCT/US2015/042778 dated Feb. 14, 2017 (8 pages).

Non-Final Office Action issued on U.S. Appl. No. 14/594,733 dated Aug. 12, 2016 (24 pages).

Non-Final Office Action issued U.S. Appl. No. 14/459,671 dated Mar. 28, 2017 (18 pages).

Canadian Office Action for 2,934,852 dated Mar. 27, 2018.

U.S. Office Action on U.S. Appl. No. 14/459,671, dated Sep. 5, 2017.

Non-Final Office Action on U.S. Appl. No. 14/459,671 dated Jul. 27, 2018.

Notice of Allowance on U.S. Appl. No. 14/459,671 dated Feb. 21, 2019.

Chinese Office Action Received for Application No. 201480071094.X, Google LLC, dated Apr. 8, 2019, 5 pages.

Examination Report Received for European Application No. 16191495.7, Google LLC, dated Mar. 8, 2019, 5 pages.

Notice of Allowance on U.S. Appl. No. 14/459,671 dated Aug. 14, 2019.

* cited by examiner

SYSTEMS AND METHODS FOR AUDIENCE MEASUREMENT

BACKGROUND

Audiences for content blocks, such as broadcast media or online streamed media, including commercial advertising, are typically measured via single-source data panels consisting of individuals or households recording content exposure over time. Potential audience values for each block are then used for planning and purchasing advertising slots. By utilizing a single-source, changes in behavior can be measured over time responsive to different campaigns. In non-broadcast platforms, such as online media delivery systems, content publishers may insert ads for users, via interstitial ads in videos, banners, etc. Panel members may run monitoring software such as browser plug-ins or extensions that transmit identifiers of received content to the panel provider for aggregation. However, different content publishers may identify content in different ways, and panels may collect data in different methods or with different standards, resulting in difficulty in capturing all content exposure for a panel or aggregating content exposure from different panels.

SUMMARY

To provide cross-media audience measurement data or data from different sources that may be integrated with panel-captured data, a lightweight communication or a "ping" may be transmitted from a client device to an audience measurement server. The ping may include a device identifier of the client device, such as a panel session identifier or a cookie, and an identification of the content. The content may include video, audio, multimedia, advertising, or any other type and form of content. In some implementations, the measurement server may filter traffic associated with a particular panel of a panel provider and forward the ping or information of the ping to said panel provider. Such implementations may not require any client-side browser plug-ins or other agents. In some implementations, panel providers may register users with the audience measurement server by having the client device first log in to the panel provider and receive a session identifier. The client device may transmit the session identifier to the audience measurement server and receive the cookie or device identifier.

In another implementation, because confidentiality may be desired by some panel providers, the providers may not need to identify their panel members to the audience measurement server. Rather, in such implementations, a client device may receive a cookie or device identifier from the audience measurement server without needing to identify the panel provider or session identifier. The cookie or device identifier may be provided to the panel provider for identification of the panel member, and measurement data may be stored and tracked by cookie or device identifier by the audience measurement server. Subsequently, the panel provider may generate a probabilistic data structure, such as a Bloom filter or quotient filter array, via a hash of the cookies or device identifiers. The panel provider may provide the array to the audience measurement server, which may utilize the filter to extract a subset of measurement data including the data of the panel members, as well as data of some non-panel members as false positives. The audience measurement server may encrypt the extracted subset of data with each cookie or device identifier corresponding to an item of data as a key, and send the encrypted data to the panel provider, thus including both panel and some non-panel data. The panel provider may attempt to decrypt each received item of data using the cookies or device identifiers associated with panel members. Because the panel provider only knows its own cookie information, it will only be able to successfully decrypt its own panel data, and will fail to decrypt data corresponding to non-members. Accordingly, panel membership is kept confidential from the audience measurement server, while panel providers are only provided with access to data of their own panels.

One implementation disclosed herein is a method for secure online audience measurement. The method includes receiving, by an audience measurement server executed by a first device, a communication transmitted from each of a plurality of client devices, each communication including an identification of an item of content and a device identifier of said client device, a first portion of the plurality of client devices operating on behalf of members of a panel measurement service. The method further includes receiving, by the audience measurement server from a second device, a request for measurement data of the members of the panel measurement service, the request including a probabilistic data structure corresponding to a hash of each device identifier of the first portion of the plurality of client devices. The method also includes filtering, by the audience measurement server via the probabilistic data structure, the received communications to select a subset of the received communications including (i) the communications including device identifiers of the first portion of the plurality of client devices and (ii) the communications including device identifiers of a second portion of the plurality of client devices not corresponding to panel members. The method further includes encrypting, by the audience measurement server, for each communication in the selected subset, the identification of the item of content with the corresponding device identifier in each said communication to generate encrypted measurement data. The method also includes transmitting, by the audience measurement server to the second device, the encrypted measurement data.

In some implementations of the method, each communication transmitted from a client device of the plurality of client devices is transmitted responsive to said client device receiving the item of content from a content provider. In many implementations, the second device successfully decrypts identifications of items of content corresponding to device identifiers of the first portion of the plurality of client devices, and fails to decrypt identifications of items of content not corresponding to device identifiers of the first portion of the plurality of client devices.

In some implementations of the method, the item of content received by each client device includes a command to cause said client device to transmit a communication to the first device. In some implementations of the method, the device identifiers of client devices of the first portion of the plurality of client devices are generated by the panel measurement service.

In some implementations, the method includes receiving a request, by the audience measurement server from a client device, for a device identifier; generating, by the audience measurement server, the device identifier; and transmitting, by the audience measurement server to the client device, the device identifier, the device identifier provided by the client device to the panel measurement service responsive to the device operating on behalf of a member of the panel measurement service.

In many implementations of the method, the probabilistic data structure comprises a Bloom filter. In other implementations, the probabilistic data structure comprises a quotient filter. In some implementations, the method includes filtering the received communications to select a subset of the received communications by determining that a hash of the device identifier of a communication matches a portion of the probabilistic data structure; and including said communication in the selected subset, responsive to the determination that the hash of the device identifier matches the portion of the probabilistic data structure. In other implementations, the method includes filtering the received communications to select a subset of the received communications by determining that a hash of the device identifier of a communication does not match a portion of the probabilistic data structure; and excluding said communication from the selected subset, responsive to the determination that the hash of the device identifier does not match a portion of the probabilistic data structure.

Another implementation presented in the present disclosure is a system for secure online audience measurement. The system includes a first device in communication with a plurality of client devices, comprising a processor and a memory. The processor is configured for receiving a communication transmitted from each of the plurality of client devices, each communication comprising an identification of an item of content and a device identifier of said client device, a first portion of the plurality of client devices operating on behalf of members of a panel measurement service. The processor is also configured for receiving, from a second device, a request for measurement data of the members of the panel measurement service, the request comprising a probabilistic data structure corresponding to a hash of each device identifier of the first portion of the plurality of client devices. The processor is further configured for filtering, via the probabilistic data structure, the received communications to select a subset of the received communications including (i) the communications including device identifiers of the first portion of the plurality of client devices and (ii) the communications including device identifiers of a second portion of the plurality of client devices not corresponding to panel members. The processor is also configured for encrypting for each communication in the selected subset, the identification of the item of content with the corresponding device identifier in each said communication to generate encrypted measurement data. The processor is also configured for transmitting, to the second device, the encrypted measurement data.

In some implementations of the system, each communication transmitted from a client device of the plurality of client devices is transmitted responsive to said client device receiving the item of content from a content provider. In other implementations, the second device successfully decrypts identifications of items of content corresponding to device identifiers of the first portion of the plurality of client devices, and fails to decrypt identifications of items of content not corresponding to device identifiers of the first portion of the plurality of client devices.

In some implementations of the system, the item of content received by each client device includes a command to cause said client device to transmit a communication to the first device. In other implementations, the device identifiers of client devices of the first portion of the plurality of client devices are generated by the panel measurement service.

In some implementations of the system, the processor is further configured for receiving a request, from a client device, for a device identifier; generating the device identifier; and transmitting, to the client device, the device identifier, the device identifier provided by the client device to the panel measurement service responsive to the device operating on behalf of a member of the panel measurement service. In many implementations of the system, the probabilistic data structure comprises a Bloom filter or a quotient filter.

In some implementations of the system, the processor is further configured for determining that a hash of the device identifier of a communication matches a portion of the probabilistic data structure; and including said communication in the selected subset, responsive to the determination that the hash of the device identifier matches the portion of the probabilistic data structure. In other implementations, the processor is further configured for determining that a hash of the device identifier of a communication does not match a portion of the probabilistic data structure; and excluding said communication from the selected subset, responsive to the determination that the hash of the device identifier does not match a portion of the probabilistic data structure.

Still another implementation presented in the present disclosure is a computer-readable storage medium storing instructions that when executed by one or more data processors, cause the one or more data processors to perform operations including receiving a communication transmitted from each of a plurality of client devices, each communication comprising an identification of an item of content and a device identifier of said client device, a first portion of the plurality of client devices operating on behalf of members of a panel measurement service. The operations also include receiving, from a second device, a request for measurement data of the members of the panel measurement service, the request comprising a probabilistic data structure corresponding to a hash of each device identifier of the first portion of the plurality of client devices. The operations further include filtering, via the probabilistic data structure, the received communications to select a subset of the received communications including (i) the communications including device identifiers of the first portion of the plurality of client devices and (ii) the communications including device identifiers of a second portion of the plurality of client devices not corresponding to panel members. The operations also include encrypting, for each communication in the selected subset, the identification of the item of content with the corresponding device identifier in each said communication to generate encrypted measurement data. The operations also include transmitting, to the second device, the encrypted measurement data.

These implementations are mentioned not to limit or define the scope of the disclosure, but to provide an example of an implementation of the disclosure to aid in understanding thereof. Particular implementations may be developed to realize one or more of the following advantages.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Like reference numbers and designations in the various drawings indicate like elements.

DETAILED DESCRIPTION

Figure 1A:
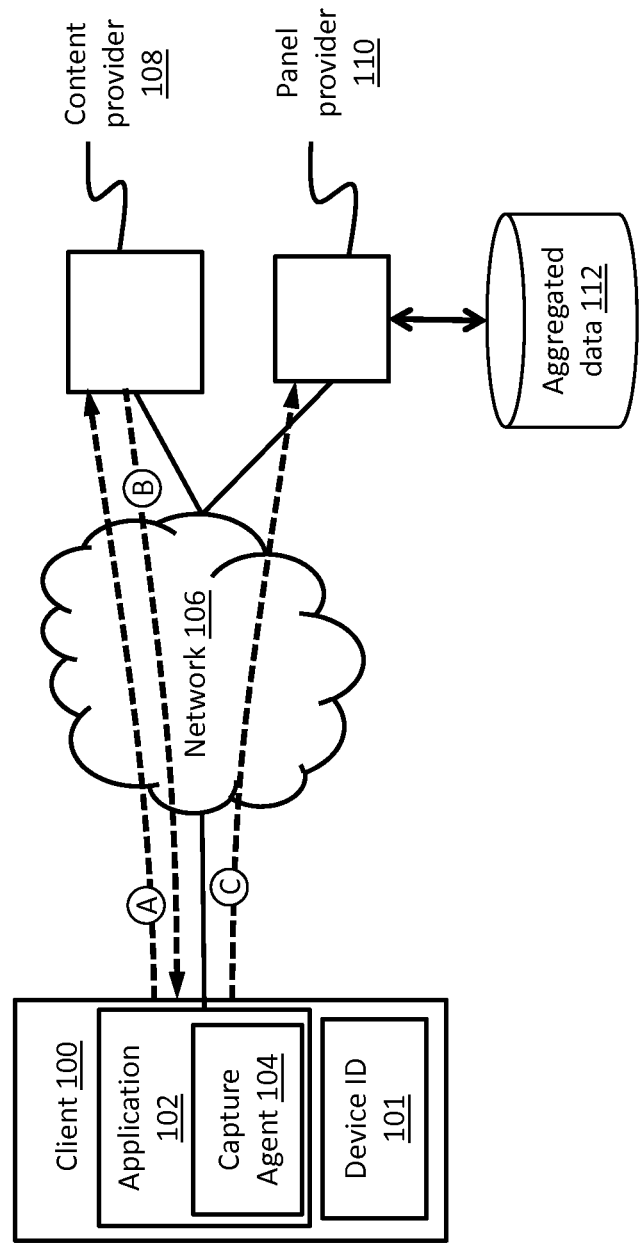
FIG. 1A is a diagram of a system for measurement of an audience of content provided by at least one content provider, according to one implementation.

Audience measurement data may include identifications of content received and displayed by a device. Such content may include audio, video, multimedia, text, animation, advertising, or other such data. Measurement of the audience of the content may be useful for measuring audience size or popularity of content for pricing and selling advertisement placements, planning content delivery schedules, or other such purposes. In traditional terrestrial or satellite broadcasting, a provider may not have direct knowledge of the number of receivers tuned in at any time, due to the lack of a back channel or communication pathway from the receiver to the provider. To overcome this limitation, audience measurement systems have used panels of participating individuals who agree to fill out surveys or diaries of content they've seen or listened to, or wear or carry a portable device that detects content played back in the vicinity and records a log for subsequent transmission to the panel provider.

Unlike typical broadcasters, Internet content providers may have direct knowledge of the number of recipient devices, via monitoring of destinations of outgoing packets, or by requesting return responses from each recipient device. However, as content delivery systems have become more complex, different items of content may be provided to a device by different providers. For example, a website may be provided by a first web server, while an embedded video is provided by a separate content delivery network, and one or more banner advertisements or interstitial video advertisements are provided by one or more separate ad delivery networks. Accordingly, a single provider may actually only have knowledge of the number of recipients of content provided by said single provider, and thus may not be able to accurately measure overall audience numbers. This may be further complicated with content delivery networks with a large number of sources, in which different individual servers may be used to provide content to a device, for example, for load balancing purposes.

In one implementation of a system to capture identifications of content delivered to a device, an agent may be executed on the device, such as a web browser plug-in or packet interceptor, or may be executed on an intermediary device between the recipient device and the content providers, such as a router, WiFi access point, gateway, or other such device. For example, referring to FIG. 1A, a diagram of a system for measurement of an audience of content provided by at least one content provider according to one implementation, is shown. A client device 100 may communicate via a network 106 with one or more content providers 108 and a panel provider 110. A client device 100, referred to variously as a client, device, client device, computing device, user device, or any other such term, may be a desktop computer, laptop computer, tablet computer, smart phone, video game console, smart television or set top box, server, workstation, or any other type and form of computing device capable of communicating over a network 106. Although only one client device 100 is illustrated for clarity, in practice, a plurality of client devices 100 may communicate with each other and/or with content or panel providers 108-110.

In some implementations, a client device 100 may execute an application 102, which may be an application, service, server, daemon, routine, or other executable logic for communicating over a network 106, such as a web browser, mail client, video player, music player, video game, or any other such application. Application 102 may include a command line interface, graphical user interface, or any combination of these or other interfaces.

A client device 100 may include a device identifier 101. Device identifier 101 may be an alphanumeric string, data string, serial number, media access control (MAC) address, internet protocol (IP) address, username or account name, globally unique identifier (GUID), cookie, random or pseudorandom number, or any other type and form of identifier, including combinations of these or other identifiers. In some implementations, the device identifier 101 may be fixed to the device or preconfigured in the device, such as a manufacturer serial number or MAC address, while in other implementations, the device identifier 1104 may be dynamically set by a panel provider 110, application 102, or other entity, such as a cookie or username. In some implementations, a unique or new device identifier 101 may be set for each communication to a panel provider 110, while in other implementations, the device identifier 101 may not be changed, or may be changed periodically (e.g. hourly, daily, weekly, etc.) or at other intervals (e.g. on restart of the client device 100, login to an internet service, etc.).

Client device 100 may execute a capture agent 104. A capture agent 104 may be a web browser plug-in or extension, packet sniffer or interceptor, screen scraper, text or data parser, monitor, application, service, daemon, routine, or other executable logic for identifying content provided to client device 100 and transmitting an identification of the content (and, in some implementations, the device identifier 101) to a panel provider 110 or other measurement service. Although illustrated as part of application 102, in many implementations, capture agent 104 may be a separate application or service. Furthermore, as discussed above, in some implementations, a capture agent 104 may be executed by an intermediary device (not illustrated) deployed between client 100 and network 106 and/or content provider(s) 108.

Client device 100 may communicate with content provider 108 and/or panel provider 110, or other client devices 100, servers, or devices via a network 106. Network 106 may be any form of computer network or combinations of networks that relay information between client devices 100, one or more content providers 108, and one or more panel providers 110, as well as other devices not illustrated. For example, network 106 may include the Internet and/or other types of data networks, such as a local area network (LAN), a wide area network (WAN), a cellular network, satellite network, or other types of data networks. Network 106 may also include any number of computing devices (e.g., computer, servers, routers, network switches, etc.) that are configured to receive and/or transmit data within network 106. Network 106 may further include any number of hardwired and/or wireless connections. For example, a client device 100 may communicate wirelessly (e.g., via WiFi, cellular, radio, etc.) with a transceiver that is hardwired (e.g., via a fiber optic cable, a CAT5 cable, etc.) to other computing devices in network 106. In some implementations, a network 106 may be a virtual network, such as a virtual network between a plurality of virtual machines executed by a single physical machine, or a abstract network such as an offline transfer of data via physically movable media (e.g. a Sneakernet, transferring data via tape media, CD-ROM, flash media, external hard drives, floppy disks, etc.).

A content provider 108 may include one or more computing devices connected to network 106 and configured for providing content to a client 100. Content provider 108 may be referred to variously as a content provider, server, web server, data server, publisher, service provider, or by other similar terms. In many implementations, content provider 108 may include a plurality of computing devices configured as a server farm or cloud, and may include routers, load balancers, network address translators, firewalls, or other such devices. For example, content providers 108 may be computer servers (e.g., FTP servers, file sharing servers, web servers, etc.) or combinations of servers (e.g., data centers, cloud computing platforms, etc.). Content providers 108 may provide any type and form of content, including text, images, video, audio, multimedia, or other data, or any combination of these. Content may include search results, blog or forum content, news articles, movies, television shows, podcasts, video games or other interactive content, advertising in any format, websites, social media, or any other type and form of content. For example, content provider 108 may be an online search engine that provides search result data to client device 100 in response to a search query. In another example, content provider 108 may be a first-party web server that provides webpage data to client device 100 in response to a request for the webpage. In still another example, content provider 108 may be a video streaming service that streams television shows or movies, along with interstitial video advertisements, banner advertisements, pre-roll or post-roll advertisements, or other such content, to a client 100 or provides insertion points for such advertisements or other such content to cause the client 100 to request the content from one or more other content providers.

According to various implementations, a content provider 108 may provide first-party webpage data to client devices 100 that includes one or more content tags. In general, a content tag refers to any piece of webpage code associated with the action of including third-party content with a first-party webpage. For example, a content tag may define a slot on a webpage for third-party content, a slot for out of page third-party content (e.g., an interstitial slot), whether third-party content should be loaded asynchronously or synchronously, whether the loading of third-party content should be disabled on the webpage, whether third-party content that loaded unsuccessfully should be refreshed, the network location of a content source that provides the third-party content (e.g., another content provider 108, panel provider 110, etc.), a network location (e.g., a URL) associated with clicking on the third-party content, how the third-party content is to be rendered on a display, a command that causes client device 100 to set a browser cookie (e.g., via a pixel tag that sets a cookie via an image request), one or more keywords used to retrieve the third-party content, and other functions associated with providing third-party content with a first-party webpage. For example, content provider 108 may serve first-party webpage data to a client device 100 that causes the client device 100 to send a request to a panel provider 110.

A panel provider 110 may include one or more computing devices connected to network 106 and configured for receiving content identifiers from one or more clients 100 for aggregation in an aggregated database 112 and/or for analysis or audience measurement. Panel provider 110 may be referred to variously as a surveyor, measurement system, server, data server, service provider, or by other similar terms. Panel provider 110 may be a plurality of devices configured in a server farm or server cloud for distributed processing, and may provide other functions. In one implementation, panel provider 110 may be an intermediary between one or more content providers 108 and clients 100, while in other implementations, panel provider 110 may communicate with content providers 108 via network 106.

In one implementation of audience measurement via client devices of panel members illustrated in the example signal flow of FIG. 1A, at step A, a client device 100 may transmit a request for content to a content provider 108. The request may be in any form or protocol, such as a Hypertext Transport Protocol (HTTP) GET request for a news article or other content at a web page. In other implementations, the request may be for a streamed video, such as a television show or movie. At step B, the content provider 108 may transmit the content to the client 100. At step C, the capture agent 104 may identify the transmitted content and transmit a content identifier (and, in some implementations, the device identifier 101) to a panel provider 110 for storage and aggregation. The content identifier may include a uniform resource locator (URL), a uniform resource identifier (URI), an alphanumeric string, a file name, an alternate identifier (alt ID), or any other such information. In some embodiments, the content identifier may include a placement of the content on a page (e.g. in an upper frame, a lower frame) or an identification of a position of the content within a hierarchy of the page (e.g. a child of an embedded element of the page).

Panel provider 110 may create an aggregated database 112, which may comprise a database, flat file, data file, array, or any other type and form of data structure for storing and aggregating content identifiers and/or device identifiers received from panel members. Aggregated database 112 may be stored in memory of a server of panel provider 110, in an external storage device, or on storage of another device, such as a storage area network (SAN), network attached storage (NAS), cloud storage, or any other type and form of storage device.

The example implementation illustrated in FIG. 1A allows for identification of some items of content delivered to the client device 100, but requires the capture agent 104 to be installed on the client. Even individuals who agree to participate in a panel or opt-in may not wish to install plug-ins or interceptors on their devices, out of security or privacy concerns. Furthermore, such technologies may not work with encrypted content, such as content delivered via the Hypertext Transfer Protocol Secure protocol (HTTPs) or via a virtual private network (VPN), and may not capture data of content in different formats or types in the same manner, making aggregation of content delivery measurements difficult.

Via the methods and systems disclosed herein, content delivery and audiences may be measured by capturing lightweight communications or "pings" transmitted from a client device to an audience measurement server, without requiring execution of separate client-side agents. The ping may include a device identifier of the client device, such as a panel session identifier or a cookie, and an identification of the content. In some implementations, the ping may include an identification of content placement within a layout, such as position of a banner, identification of a frame, or other such indicators. The ping may be transmitted responsive to rendering of a webpage or other data, execution of an embedded script, or other such functions. For example, in one implementation, the ping may be a Hypertext Transfer Protocol (HTTP) GET request for a one pixel image with parameter-value pairs to identify the device identifier and content displayed with or embedded in the page triggering the GET request or a separate HTTP request (such as in response to an A PING tag). In another implementation, the ping may be a request for the item of content and may be transmitted to the audience measurement server, said audience measurement server redirecting the request (e.g. via an HTTP 302 redirect or similar method), to the content provider.

Figure 1B:
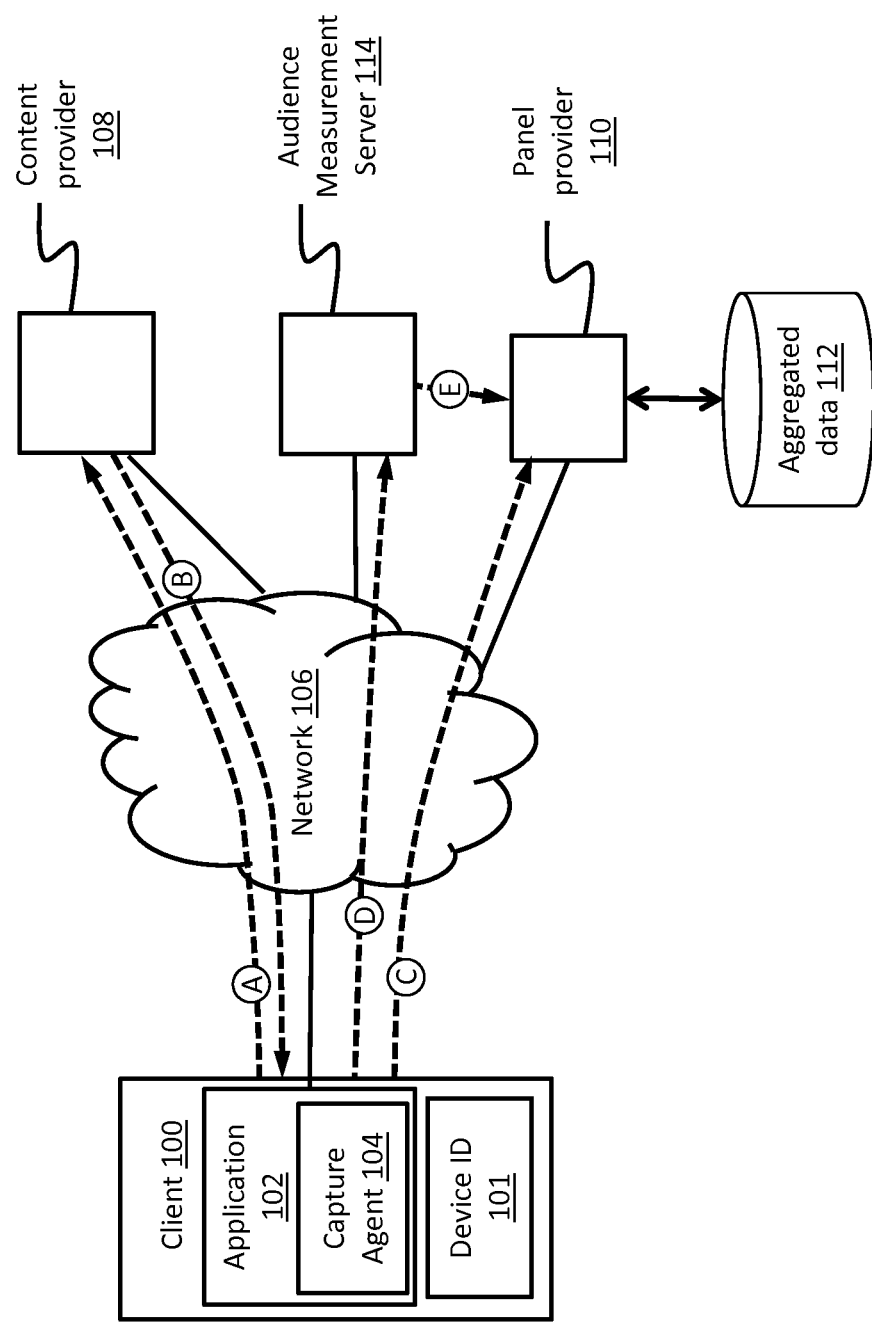
FIG. 1B is a diagram of a system for measurement of an audience of content provided by at least one content provider, with data provided by an audience measurement server aggregated with panel provider captured data, according to one implementation.

Illustrated in FIG. 1B is a diagram of a system for measurement of an audience of content provided by at least one content provider, with aggregation of data provided by an audience measurement server, according to one implementation. An audience measurement server 114 may comprise one or more devices receiving content identifiers and/or device identifiers from a client 100, and providing the received content identifiers and/or device identifiers to a panel provider 110. Although illustrated in parallel with a panel provider 110 and content provider 108, in some implementations, an audience measurement server 114 may be deployed as an intermediary between one or both of panel provider 110 and content provider and a client 100.

In the exemplary flow illustrated in FIG. 1B and similar to FIG. 1A above, at step A, a client device 100 may transmit a request for content to a content provider 108. At step B, the content provider 108 may transmit the content to the client 100. At step C, in some implementations, the capture agent 104 may identify the transmitted content and transmit a content identifier (and, in some implementations, the device identifier 101) to a panel provider 110 for storage and aggregation. In other implementations, such as where a capture agent 104 is not installed on the client 100, or where a capture agent 104 is not able to detect the content (e.g. if the content is encrypted or embedded within other content), step C may be skipped or optional.

At step D, the application 102 of the client may transmit the content identifier and/or device identifier 101 to the audience measurement server. The application 102 may transmit the content identifier and/or device identifier 101 responsive to a command included in the received content, such as a IMG tag in an HTTP document that causes a web browser 102 to request the corresponding image from the audience measurement server 114, in some implementations. Such images may be a one pixel by one pixel image or a transparent image, to avoid any visual artifacts being displayed by client 100 upon receipt of the image. The content identifier may be a portion of a URL of the image, or a parameter of the URL transmitted in the request to the server. For example, in one such implementation, a different URL may be included in the page for each item of content transmitted to the client (e.g. "http://www.example.com/img/content_id_001.jpg" to identify a predetermined first item of content), while in another such implementation, the content may be identified as a parameter (e.g. "http://www.example.com/img/content.jpg?id=001"). Still other methods of transmitting the content identifier to the audience measurement server may be used. For example, in some implementations, an embedded tag or link to the content may include an HTML PING tag that causes application 102 to transmit a first request for the document or content identified by a URL in the tag, and to transmit a second communication to a URL specified by the PING tag (e.g. the audience measurement server 114). In still another implementation, the application 102 may request the content at a URL of the audience measurement server 114, which may store an identification of the requested content, and respond with an HTTP redirection (e.g. status code 302, or a HTTP refresh header specifying a different URL) identifying the URL of the requested content at the content provider 108. In many implementations, the application 102 may include a device identifier 101 or cookie with the request, for example, as a cookie within the HTTP GET request.

At step E, the content identifier and/or device identifier 101 may be forwarded by audience measurement server 114 to panel provider 110. In some implementations, the content identifier may be forwarded immediately, while in other implementations, the content identifier and/or device identifier 101 may be stored and aggregated with other received content identifiers for subsequent transmission to panel provider 110.

In some implementations, such as where a capture agent 104 is executed by a client device 100, the panel provider may aggregate data received from the capture agent at step C and data received from the audience measurement server 114 at step E. For example, data received at step C may identify banner advertisements and web pages received by the client device 100, while data received from the audience measurement server 114 at step E may identify interstitial advertisements in video, streamed television shows or movies, video games, or other content. The panel provider 110 may combine and aggregate this data by device identifier, to create an overall log or record of content presented to device 100. In many implementations, the content identifiers received at step E may also include content identifiers for content identified at step C; in such implementations, panel provider 110 may remove duplicates when combining the data. In some implementations, content identifiers may include timestamps to aid in such correlation and duplicate entry removal.

Figure 1C:
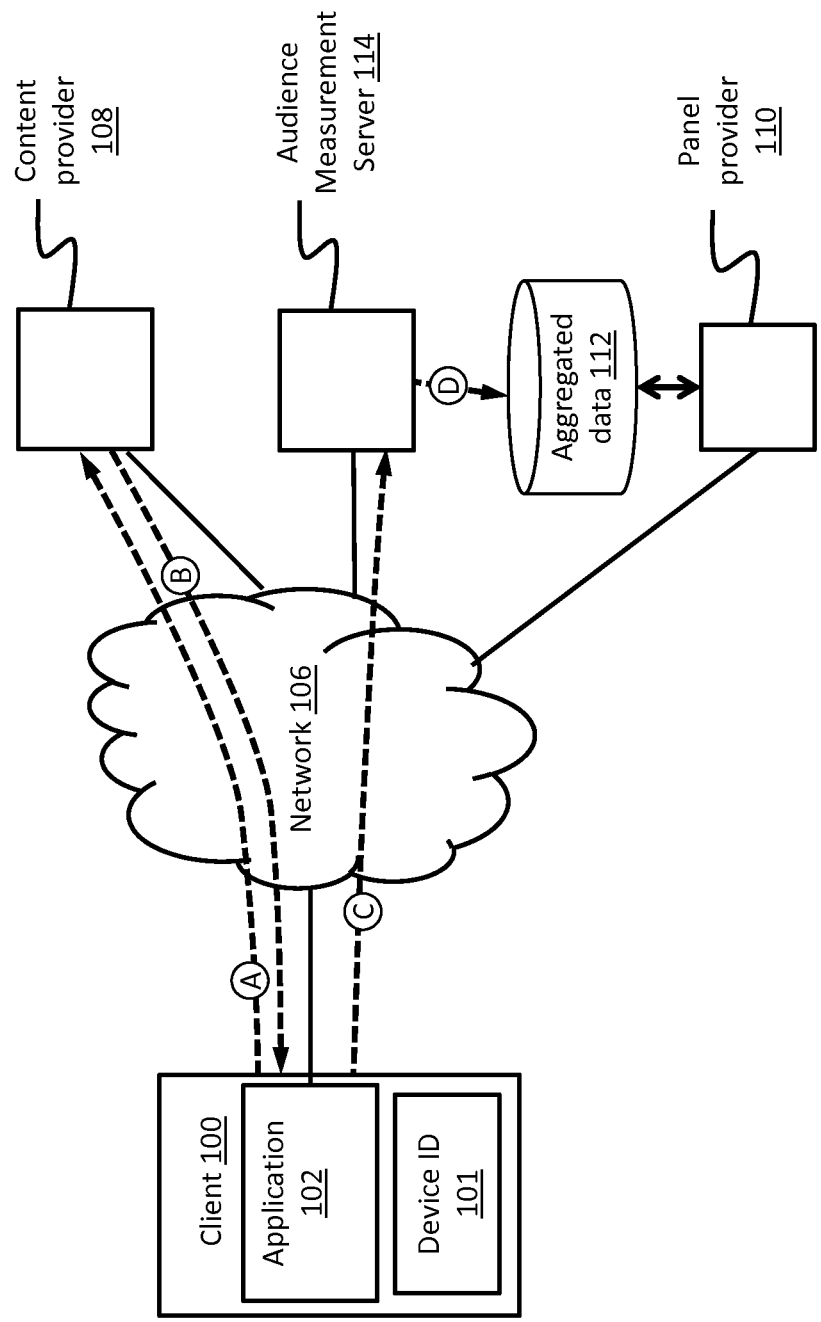
FIG. 1C is a diagram of a system for measurement of an audience of content provided by at least one content provider via an audience measurement server, according to one implementation.

As shown in the implementation depicted in FIG. 1B, an audience measurement server 114 may receive content identifiers of all content displayed by the client device 100, and may thus provide a more complete record than a capture agent 104. Accordingly, in many implementations, no capture agent 104 need be installed on client device 100. FIG. 1C is a diagram of such an implementation of a system for measurement of an audience of content provided by at least one content provider via an audience measurement server.

Similar to steps D and E of FIG. 1B, an audience measurement server 114 may receive content identifiers and/or device identifiers 101 at step C, and forward or aggregate and forward the identifiers to a panel provider 110 at step D. In many implementations, as shown, data may be aggregated by the audience measurement server 114, reducing load on the servers of panel provider 110. In other implementations not illustrated, data may be transmitted to a panel provider 110 for storage in an aggregated database 112.

In a further implementation, audience measurement server 114 may redirect a portion of the communications identifying content identifiers and device identifiers, such as that shown in step C of FIG. 1C, to a panel provider 110. For example, audience measurement server 114 may respond to a portion of the communications with an HTTP refresh or redirect identifying a URL of the panel provider 110, such as 1%, 5% or any other portion of the communications. This may allow the panel provider 110 to directly receive a portion of the audience measurement data from the client devices, and thus statistically audit the aggregated data received from the audience measurement server 114.

In many implementations of single-source panel measurement, panel providers 110 require users or devices to authenticate or log in with the panel provider, such as via a user name or account name or password or other authentication system. This may be done to allow tracking of content displayed to a specific user or transmitted to a device over time, such as over a multi-session, multi-day, multi-week, or other such period. In some implementations, authentication may be handled via a browser plug-in or collection agent as discussed above. In other implementations, authentication may be handled via logging in to a service of the panel provider, and the panel provider may transmit a session identifier or cookie to the device. The session identifier or cookie may be set to expire after a predetermined amount of time, or upon ending the session (e.g. terminating execution of a web browser or application, restarting a computing device or putting the device to sleep, etc.).

Figure 1D:
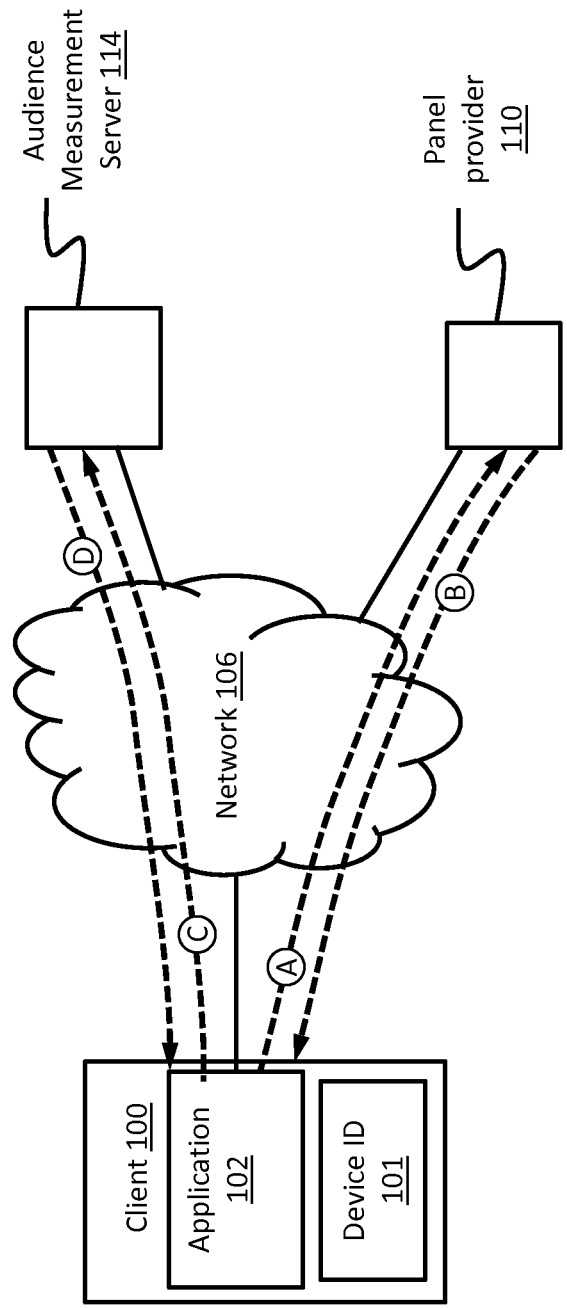
FIG. 1D is a diagram of a system for registration of panel members with an audience measurement server, according to one implementation.

To allow identification and measurement of content received by specific panel members during a session or other period without requiring a collection agent, in some implementations, panel providers may register users with the audience measurement server by having the client device first log in to the panel provider and receive a session identifier, and then having the client device transmit the session identifier to the audience measurement server. The audience measurement server may transmit a cookie or device identifier to the device to use when transmitting content identifiers. For example, FIG. 1D illustrates a diagram of a system for registration of panel members with an audience measurement server 114, according to one such implementation. As shown, at step A, a client device 100 may log in, register, or otherwise authenticate itself to a panel provider 110. At step B, the panel provider 110 may transmit a session identifier to the client device. At step C, the client device may transmit the session identifier to the audience measurement server 114. The audience measurement server 114 may generate a cookie or device identifier 101 corresponding to the session identifier, and transmit the cookie or device identifier 101 to the client 100 at step D, for future transmission with content identifiers. The audience measurement server 114 may maintain a record of session identifiers and associated cookies or device identifiers, such that when the audience measurement server provides content identifiers to the panel provider 110 for aggregation or analysis, the content identifiers may be identified with the session identifier and, accordingly, the panel member.

In a similar implementation, to improve confidentiality of the panel, session identifiers may not be provided to the audience measurement server 114 at step C; rather, the device 100 may simply request a device identifier 101 or cookie from the audience measurement server 114. Upon receipt of the device identifier or cookie at step D, in some implementations, the client device 100 may transmit the device identifier or cookie to the panel provider 110. The panel provider 110 may associate the device identifier or cookie with the session identifier sent to the client device 100 or a generated session identifier. Upon subsequent receipt of content identifiers and device identifiers or cookies, the panel provider 110 may utilize the stored association to identify which content identifiers correspond to which devices 100.

In a similar implementation not illustrated, an intermediary device deployed between client device 100 and network 106 may handle registration with the panel provider 110 and transmission, receipt, or request of session identifiers, device identifiers, or cookies. Such intermediary devices, such as routers or gateways, may be used to measure content delivered to a panel household or group of users, rather than individual users or devices. This may be done to both reduce complexity of the system (avoiding installing collection agents on a plurality of devices) and to increase individual privacy for panel participants. In such implementations, the intermediary device may perform one or more of steps A-D illustrated in FIG. 1D.

Figure 2A:
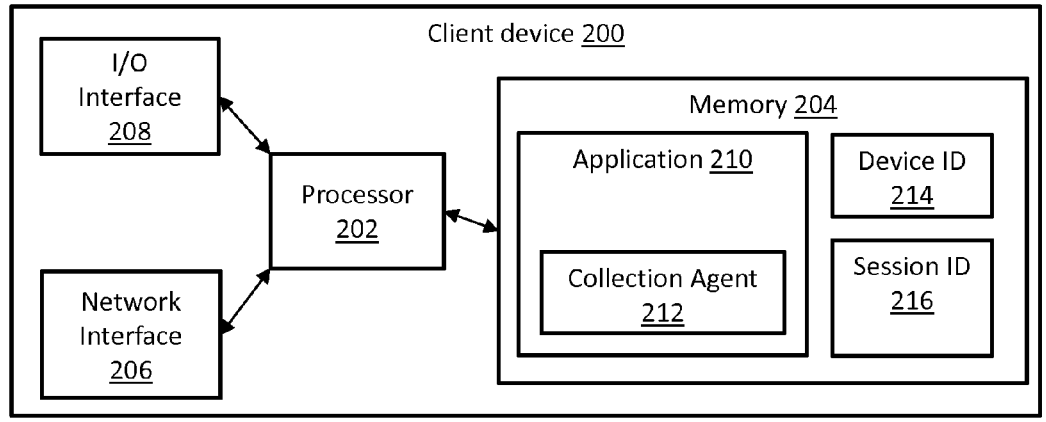
FIG. 2A is a block diagram of a client device, according to one implementation.

Illustrated in FIG. 2A is a block diagram of one implementation of a computing device 200 of a client, panel participant, or non-panel participant, such as client devices 100. Client device 200 may be any number of different types of user electronic devices configured to communicate via network 106, including without limitation, a laptop computer, a desktop computer, a tablet computer, a smartphone, a digital video recorder, a set-top box for a television, a video game console, or any other type and form of computing device or combinations of devices. In some implementations, the type of client device 200 may be categorized as a mobile device, a desktop device or a device intended to remain stationary or configured to primarily access network 106 via a local area network, or another category of electronic devices such as a media consumption device.

In many implementations, client device 200 includes a processor 202 and a memory 204. Memory 204 may store machine instructions that, when executed by processor 202 cause processor 202 to perform one or more of the operations described herein. Processor 202 may include a microprocessor, ASIC, FPGA, etc., or combinations thereof. In many implementations, processor 202 may be a multi-core processor or an array of processors. Memory 202 may include, but is not limited to, electronic, optical, magnetic, or any other storage devices capable of providing processor 202 with program instructions. Memory 202 may include a floppy disk, CD-ROM, DVD, magnetic disk, memory chip, ROM, RAM, EEPROM, EPROM, flash memory, optical media, or any other suitable memory from which processor 202 can read instructions. The instructions may include code from any suitable computer programming language such as, but not limited to, C, C++, C#, Java, JavaScript, Perl, HTML, XML, Python and Visual Basic.

Client device 200 may include one or more network interfaces 206. A network interface 206 may include any type and form of interface, including Ethernet including 10 Base T, 100 Base T, or 1000 Base T ("Gigabit"); any of the varieties of 802.11 wireless, such as 802.11a, 802.11b, 802.11g, 802.11n, or 802.11ac; cellular, including CDMA, LTE, 3G, or 4G cellular; Bluetooth or other short range wireless connections; or any combination of these or other interfaces for communicating with a network 106. In many implementations, client device 200 may include a plurality of network interfaces 206 of different types, allowing for connections to a variety of networks 106 or a network 106 such as the Internet via different sub-networks.

Client device 200 may include one or more user interface devices 208. A user interface device 208 may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interface devices may be internal to the housing of client device 200, such as a built-in display, touch screen, microphone, etc., or external to the housing of client device 200, such as a monitor connected to client device 200, a speaker connected to client device 200, etc., according to various implementations.

Client device 200 may include in memory 204 an application 210 or may execute an application 210 with a processor 202. Application 210 may be an application, applet, script, service, daemon, routine, or other executable logic for receiving content and for transmitting responses, commands, or other data. In one implementation, application 210 may be a web browser, while in another implementation, application 210 may be a video game. Application 210 may include functionality for displaying content received via network interface 206 and/or generated locally by processor 202, and for transmitting interactions received via a user interface device 208, such as requests for websites, selections of survey response options, input text strings, etc.

In some implementations, application 210 may include a data collector 212. For example, data collector 212 may include an application plug-in, application extension, subroutine, browser toolbar, daemon, or other executable logic for collecting data processed by application 210. In other implementations, a data collector 212 may be a separate application, service, daemon, routine, or other executable logic separate from application 210 but configured for intercepting and/or collecting data processed by application 210, such as a screen scraper, packet interceptor, API hooking process, or other such application. Data collector 212 may be configured for intercepting or receiving data input via user interface device 208, such as Internet search queries, text strings, survey response selections, or other values, or data received and processed by application 210 including websites visited, time spent interacting with a website or application, pages read, or other such data. In many implementations, data collector 212 may store some or all of this data or identifiers of such data in a behavior history database or other data structure, and may include identifications of websites visited, web links followed, search queries entered, or other such data. In some implementations, the data may be anonymized or disambiguated to reduce personally identifiable information. For example, rather than recording individual search queries entered, such as a query for "vacation spots in France", a data collector 212 may identify predetermined categories corresponding to the search queries, such as "European tourism" or "travel" and record an indication of a search relating to the predetermined category. In other implementations, a data collector 212 may identify streamed multimedia content received by a client device, such as a television show, movie, song, music video, or other such content. Content may be identified based on identifier tags including ID3 tags or other such metadata, uniform resource locators (URLs) or uniform resource identifiers (URIs), filenames, or any other type and form of data accompanying the content. In other implementations, the data collector 212 may be executed by a server, or by an intermediary device deployed between the client and server, such as a router, cable modem, or other such device. For example, data requests and responses may be parsed by a data collector 212 executing on an intermediary router as the requests and responses traverse the router. In some implementations, this may allow for monitoring of all data flow to/from a household, without requiring installation of the data collector 212 on a plurality of devices within the household.

Client 200 may include or be identified with a device identifier 214. Device identifier 214 may include any type and form of identification, including without limitation a MAC address, text and/or numerical data string, a username, a cryptographic public key, cookies, device serial numbers, user profile data, network addresses, or any other such identifier that may be used to distinguish the client 200 from other clients 200. In some implementations, a device identifier 214 may be associated with one or more other device identifiers 214 (e.g., a device identifier for a mobile device, a device identifier for a home computer, etc.). In many implementations, as discussed above, a device identifier 214 may be generated and/or transmitted to the device 200 by a panel provider or audience measurement server, and may be transmitted responsive to a request or successfully logging in, registering, or authenticating with the panel provider. Accordingly, in some implementations, client 200 may include a session identifier 216 generated by a panel provider. In other implementations, as discussed above, client 200 may request a device identifier or cookie 214 from an audience measurement server, and may transmit the device identifier or cookie 214 to a panel provider for association with the device and/or a session identifier. In some such implementations, the session identifier may be stored or maintained by the panel provider and not provided to the device.

Figure 2B:
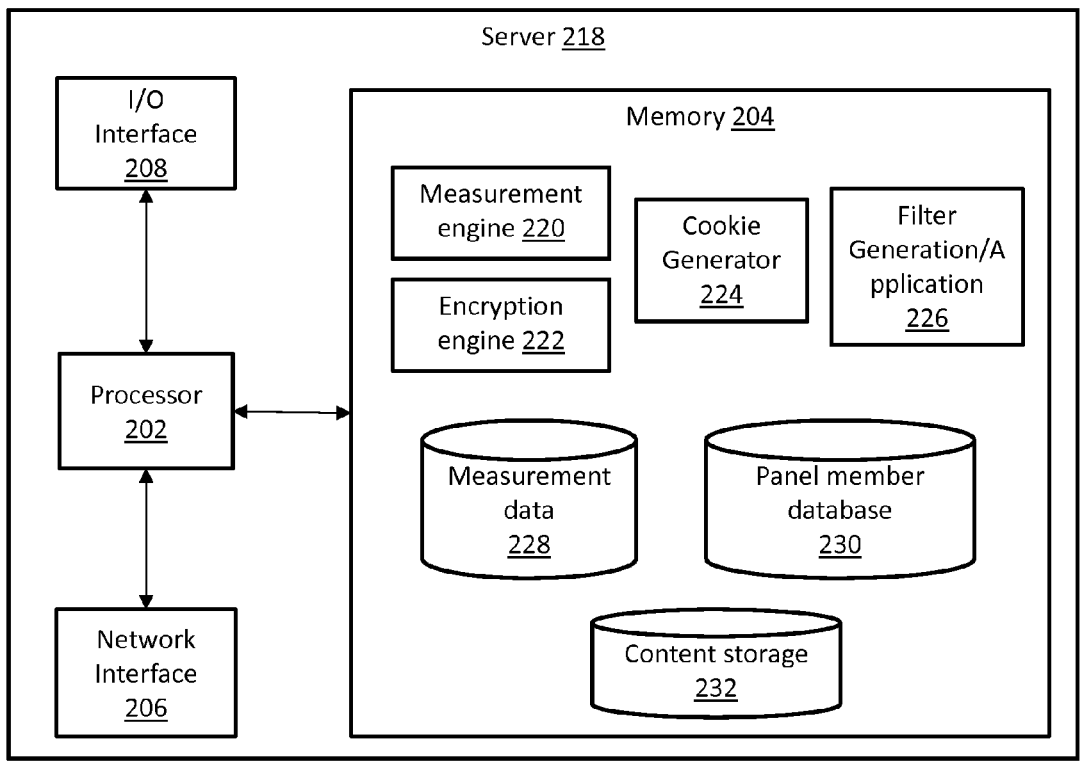
FIG. 2B is a block diagram of a server device, according to one implementation.

Referring now to FIG. 2B, illustrated is a block diagram of an implementation of a computing device or server 218, such as an audience measurement server 114, content provider 108, or panel provider 110, as discussed above in connection with FIGS. 1A-1D. As with client devices 200, server 218 may include one or more processors 202, memories 204, network interfaces 206, and user interfaces 208. In some implementations referred to as headless servers, a server 218 may not include a user interface 208, but may communicate with clients 200 with user interfaces 208 via a network 106. Memory 204 may include content storage 232, such as storage of webpages, images, audio files, video files, data files, or any other type and form of data. In some implementations, memory 204 may store one or more applications 210 (not illustrated) for execution by processor 202 of the server 218, including FTP servers, web servers, mail servers, file sharing servers, peer to peer servers, or other such applications for delivering content stored in content storage 232.

In some implementations, a server 218 may execute a measurement engine 220. Measurement engine 220 may comprise an application, service, server, daemon, routine, or other executable logic for measuring an audience of an item of content, including receiving content identifiers and/or device identifiers, aggregating or sorting content identifiers according to a device identifier, and measuring an audience for an item of content during a time period. For example, measurement engine may count the number of content identifiers identifying a particular item of content received over a period of time, such as an hour, associated with distinct device identifiers, to count a size of an audience that received the item of content. This audience measurement may be provided to content providers, advertising providers, marketers, publishers, analysts, or others.

In some implementations, server 218 may execute an encryption engine 222, sometimes referred to as a decryption engine or an encryption/decryption engine, depending on usage. An encryption engine 222 may comprise an application, service, routine, server, daemon, or other executable logic for encrypting data. In some implementations, an encryption engine 222 may comprise or interact with encryption hardware. Encryption engine 222 may perform any type of encryption and/or decryption algorithm, including any variety of the advanced encryption standard (AES) algorithm, the secure hash algorithm (SHA), or any other type of symmetric encryption. In other implementations, encryption engine 222 may perform any other type of encryption and/or decryption, including asymmetric encryption schemes, public key cryptography methods, cryptographic hashing functions, or any other type and form of cipher or cryptography. In some implementations discussed in more detail below, an encryption engine 222 may be used to encrypt content identifiers received from one or more client devices for transmission to a panel provider. In one such implementation, each content identifier may be encrypted with the device identifier, cookie, or session identifier associated with the device. As the panel provider will have knowledge of the session identifiers, device identifiers, or cookies of its panel members in various implementations, the panel provider will be able to decrypt the content identifiers for aggregation and analysis, while being unable to decrypt any data corresponding to non-panel members or members of other panels not managed by the panel provider.

In some implementations, a server 218 may execute a filter generation/application module 226, referred to variously as a filter generator, filter module, filter, or other such names. In some implementations, a filter generator 226 may generate a probabilistic data structure identifying device identifiers of members of a panel provided by a panel provider. Such structures may include Bloom filter arrays or quotient filter arrays, or any other type and form of probabilistic data structure, discussed in more detail in connection with FIGS. 5A and 5B below. In many implementations, the filter array or data structure may be applied by a filter application module 226 to extract data from a measurement database, such as content and device identifiers, to generate a subset of the data corresponding to the device identifiers used to generate the probabilistic data structure. In many implementations, the filter may also extract some portion of the remaining data responsive to a number of false positives resulting from application of the filter to device identifiers of devices not part of the panel. As discussed above, in such implementations, each content identifier may be encrypted with the corresponding device or session identifier. Accordingly, even though data corresponding to false positives from the array may be provided to the panel provider, the panel provider may not be able to successfully decrypt the data. Thus, the audience measurement server may provide a set of data to a panel provider including all of the panel members' data plus some non-panel members' data, without being able to identify which devices are part of the panel; and the panel provider may be able to receive and decode all of the panel members' data, without gaining access to data of non-panel members. Accordingly, in many such implementations, a plurality of panel providers may utilize the same audience measurement system without sacrificing confidentiality of their respective panels and without gaining access to each other's data.

In some implementations, a server 218 may maintain a measurement database 228 and/or a panel member database 230. A measurement database 228 may comprise any type and form of database, flat file, data file, data array, or other data structure, for storing a plurality of content identifiers with corresponding device identifiers, cookies, and/or session identifiers. In many implementations, a measurement database 228 may also include a timestamp of received or transmitted content identifiers.

Similarly, in some implementations, a panel member database 230 may comprise any type and form of database, flat file, data file, data array, or other data structure, for identifying and authenticating panel members and associating session identifiers and/or device identifiers or cookies with a device or group of devices (such as devices in a household). In some implementations, panel member database 230 may further comprise account information of a panel member, including user or account names, login passwords or other credentials, device types, or other parameters (e.g. operating system, web browser type or other application type, network connection type or speed, geographic location, etc.).

In some implementations, a measurement database 228 may be maintained by an audience measurement server, while a panel member database 230 is maintained by a panel provider. In some implementations, a measurement database 228 may be stored in a location accessible by both an audience measurement server and one or more panel providers. In still other implementations, an audience measurement server may store or maintain a measurement database 228, and may transmit the database or a portion of the database 228 to a panel provider.

As discussed above in connection with FIG. 1D, in many implementations, a panel member may register or log in to a panel provider when beginning a session of interaction with online content. For example, some panel providers provide incentives to users for participation in a single-source panel, such as coupons or discounts on products, free services, or other such enticements. Accordingly, panel members may sign up or opt-in to participate in data collection. To protect privacy of participants, data collection may be limited or anonymized in many implementations. To track participation, the panel providers may provide a client agent to be executed on the client device, such as a web browser plug-in or application, or the client device may log in or register a session with the panel. In some implementations, the session may be time limited and expire automatically after a predetermined time, while in other implementations, the client device may transmit a first communication to initiate a session and a second communication to terminate the session.

Figure 3A:
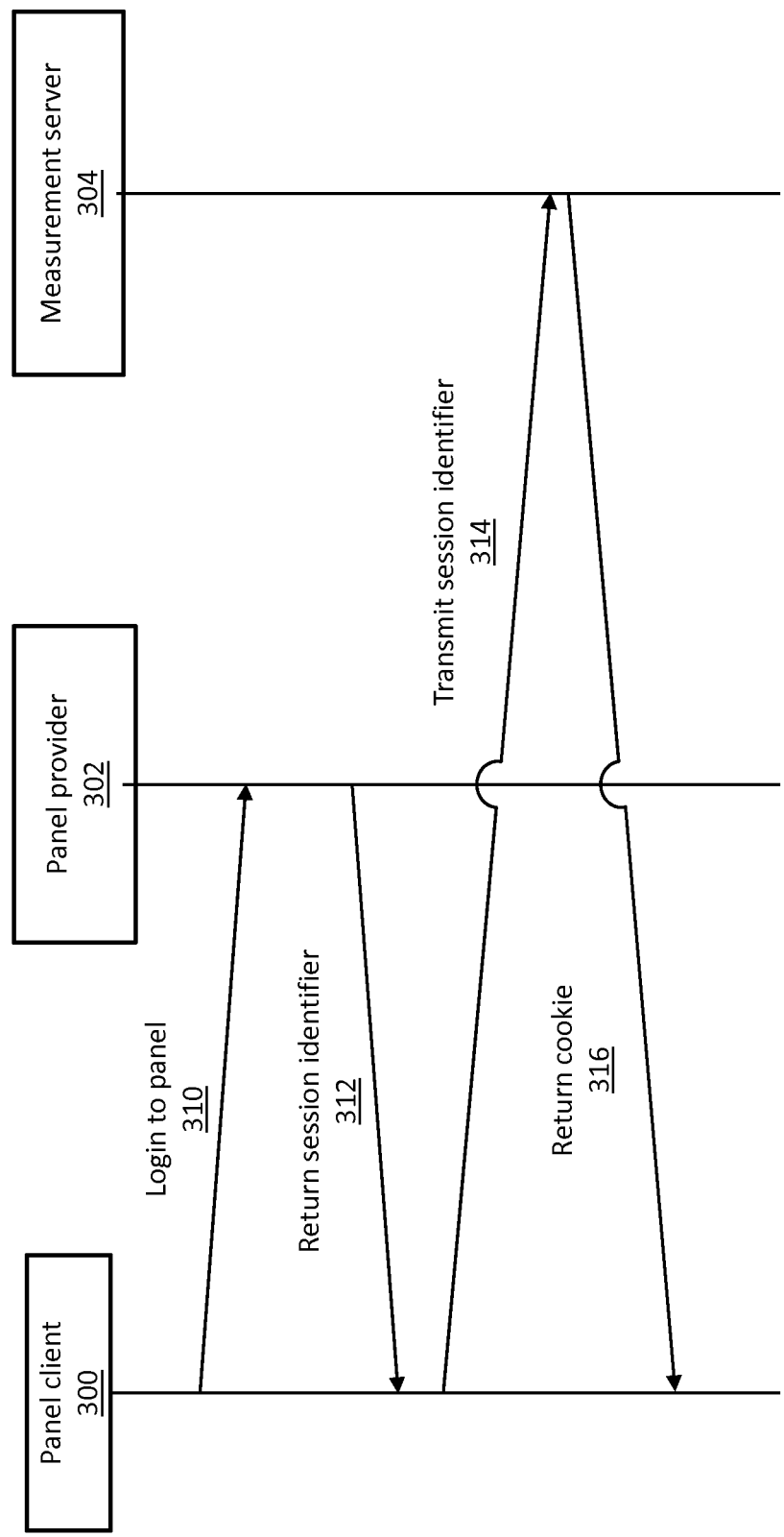
FIG. 3A is a signal flow diagram of one implementation of a process for registration of panel members with an audience measurement server, according to one implementation.

FIG. 3A is a signal flow diagram of one implementation of a process for registration of panel members with an audience measurement server, according to one implementation. As shown, a panel client or client device of a panel member 300 may communicate with a device or server of a panel provider 302 and an audience measurement server 304 via one or more networks 106 (not illustrated). At step 310, the panel client 300 may transmit a communication to a panel provider 302 to log in. In some implementations not illustrated, step 310 may include a plurality of request and response communications, such as a request for a secure login page and a response with a secure login page; a request to log in via a user name and/or password and a response indicating success (or failure, in case of incorrect input); etc. In some implementations, a user of panel client 300 may enter one or more parameters or credentials for log in, such as an account or user name or password, while in other implementations, panel client 300 may provide an identifier to the panel provider 302 to log in (e.g. a MAC address, stored account number, certificate, etc.).

The panel provider 302 may authenticate the panel client 300 and, in some implementations, generate and transmit a session identifier to the panel client 300 at step 312. The session identifier may comprise an alphanumeric string or other identifier of any type and form. As discussed above, the session identifier may include an expiration time or be set to automatically expire after a predetermined time period. In many implementations, the panel provider 302 may store a record associating the generated session identifier with the panel client 300 or login credentials of the panel client 300. In some such implementations, when the panel provider subsequently receives aggregated measurement data from a measurement server 304 with content identifiers and corresponding session identifiers, the measurement server 304 may be able to replace session identifiers with identifiers of specific panel client devices, households, or individual participants. Accordingly, multiple session identifiers may be associated with a single device, allowing tracking of differences in reception of content across different sessions or over a larger time period than a single session.

In some implementations, the panel client 300 may transmit the session identifier to the measurement server 304 at step 314. As discussed above, the session identifier may include an expiration time or be set to automatically expire after a predetermined time period. In many implementations, the measurement server 304 may generate a cookie or device identifier (e.g. another alphanumeric string), and transmit the cookie or device identifier to the panel client at step 316. In many implementations, the measurement server 304 may store a record associating the session identifier with the panel client 300 via the device identifier or cookie. In some such implementations, the measurement server 304 may associate content identifiers received from the panel client 300 with the session identifier via the device identifier or cookie included in the communication with the content identifier. The measurement server 304 may subsequently aggregate and/or provide the content identifiers, associated with their corresponding session identifier, to a panel provider 302.

In other implementations, as discussed above, the panel client 300 may not transmit the session identifier to the measurement server 304 at step 314, but may instead transmit a request for a cookie or device identifier. In some implementations, the cookie or device identifier may be transmitted by the client device (and/or the audience measurement server) to the panel provider. This may provide increased confidentiality of panel member information: because a panel provider may use sequential session identifiers or session identifiers with a unique format, if a plurality of session identifiers in a sequence or having a similar format from a plurality of client devices, the server may be able to determine that the client devices are all part of the same panel. Accordingly, by not providing any such information to the audience measurement server, the server may only be able to determine that a client device is a member of some panel, without knowing the specific panel or panel provider.

In some other implementations, steps 314 and 316 may be skipped, and the device identifier or cookie may be generated by the panel provider or the panel client, or the session identifier may be used as a third-party cookie or identifier. For example, responsive to receiving an item of content, the panel client may transmit a communication to the measurement server including a content identifier and the session identifier or an identifier of the client (e.g. MAC address, IP address, GUID, predetermined random number string, etc.). The measurement server may determine if prior communications have been received that included the same identifier of the client or session identifier, and if so, aggregate the communication with such prior communications. If not, the measurement server may add a new entry to a measurement database for the newly received session identifier or client identifier.

Figure 3B:
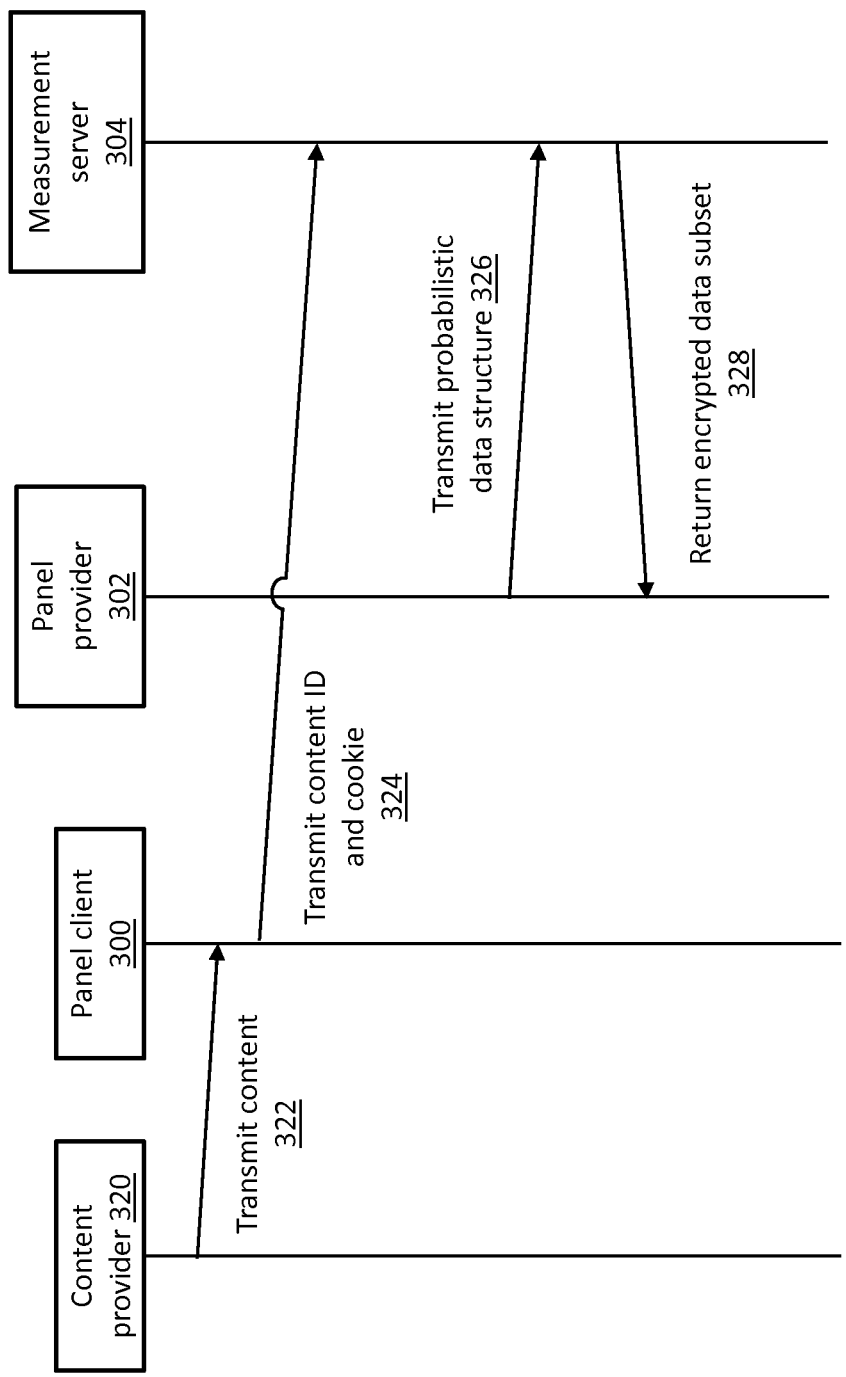
FIG. 3B is a signal flow diagram of one implementation of a process for audience measurement via an audience measurement server, according to one implementation.

Cookies, device identifiers, or session identifiers may be used to encrypt measurement data before providing the data to panel providers. This may be done both to increase security of the transmitted data against interception and to provide increased confidentiality of panel membership. Because confidentiality may be desired by some panel providers, the providers may not need to identify their panel members to the audience measurement server. FIG. 3B is a signal flow diagram of one implementation of a process for secure and confidential audience measurement via an audience measurement server, according to one implementation. A panel client 300 may receive content from a content provider 320 at step 322. As discussed above, content may include audio, video, multimedia, animation, text, HTML, executable code, or other data. The content may include an embedded command to cause the panel client 300 to transmit an identification of the content and a cookie, session identifier, or device identifier to a measurement server 304 at step 324. As discussed above, the embedded command may comprise an HTML IMG tag with a URL of the measurement server, an HTML PING tag within a link, an executable script such as a Javascript command, or any other such commands. The content identifier and cookie, session identifier, or device identifier may be sent as parameters within a request (such as a parameter within a URL, a parameter of a POST request, or any other type and form of request), may be included in a header of a request (e.g. in a TCP options field, or any other portion of a header at the transport layer, session layer, application layer, network layer, or any other such layer of a network communication), or may be otherwise provided to the measurement server.

Content identifiers may be stored and tracked by or associated with the received cookie, device identifier, or session identifier by the audience measurement server, and may be grouped or aggregated by said cookie, device identifier, or session identifier. Although only one client and communication is shown, in many implementations, measurement server 304 may communicate with and receive measurement data from a plurality of clients 300. To retrieve measurement data, the panel provider 302 may generate a probabilistic data structure, such as a Bloom filter or quotient filter array or other data structure in which false positive matches are possible but false negatives are not, via a hash of the cookies, device identifiers, or session identifiers of its panel members. At step 326, the panel provider may provide the array to the audience measurement server, which may utilize the filter to extract a subset of measurement data including the data of the panel members, as well as data of some non-panel members as false positives. The audience measurement server may encrypt the extracted subset of data with each cookie, device identifier, or session identifier corresponding to an item of data as a key, and send the encrypted data to the panel provider at step 328, thus including both panel and some non-panel data. The panel provider may attempt to decrypt each received item of data using the cookies, device identifiers, or session identifiers associated with panel members. Because the panel provider only knows the identifiers or cookies of its own panel members and not members of competitor's panels, the panel provider will only be able to successfully decrypt its own panel data, and will fail to decrypt data corresponding to non-members. Accordingly, panel membership is kept confidential from the audience measurement server, while panel providers are only provided with access to data of their own panels.

Figure 4A:
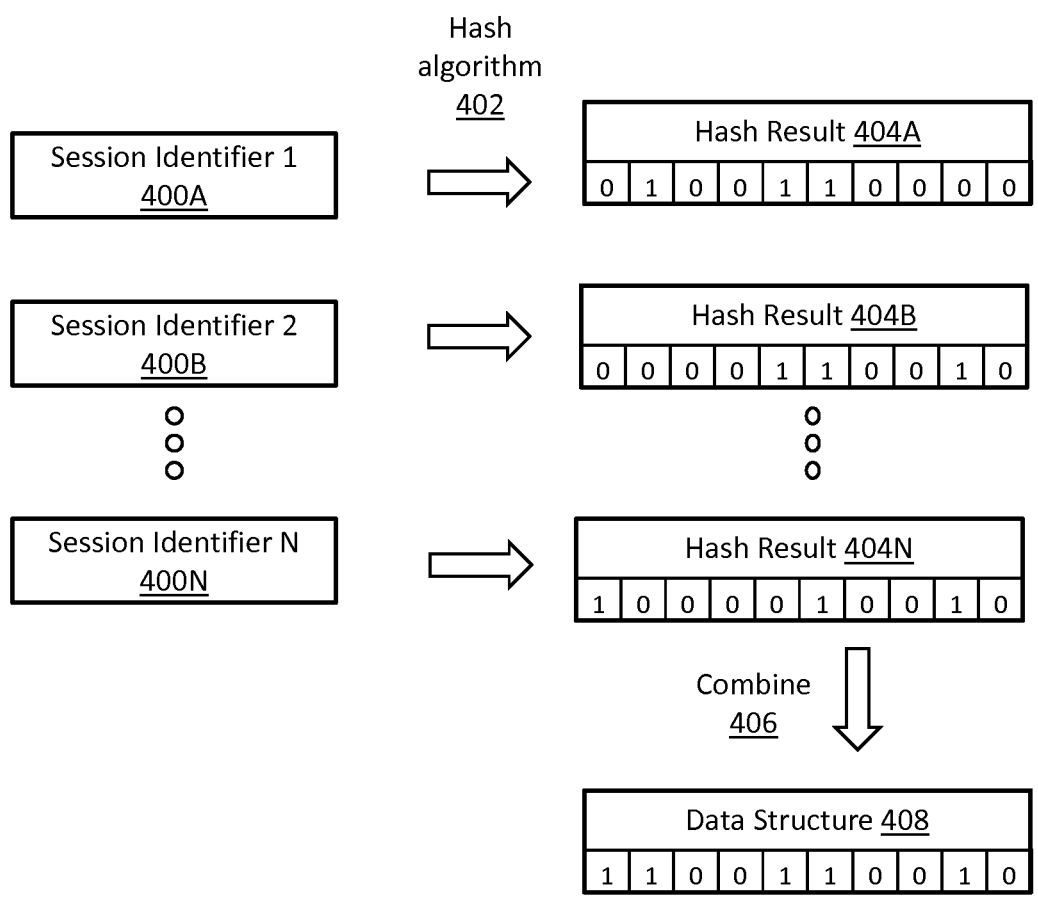
FIG. 4A is a diagram of an example of generation of a probabilistic data structure for filtering audience measurement data, according to one implementation.

As discussed above, in many implementations, a panel provider 302 may generate a probabilistic data structure, such as a Bloom filter or quotient filter array or other data structure in which false positive matches are possible but false negatives are not, via a hash of the cookies, device identifiers, or session identifiers of its panel members. FIG. 4A is a diagram of an example of generation of a probabilistic data structure for filtering audience measurement data, according to one implementation. One or more session identifiers, cookies, device identifiers, or other data strings 400A-400N (referred to generally as an identifier 400) may be hashed via a hash algorithm 402 to generate a corresponding set of hash results 404A-404N (referred to generally as a result 404). The hash results 404 may be combined at step 406 to create a probabilistic data structure 408 including each hash result.

The hash algorithm 402 may include a plurality of different hash functions, such that each hash function maps an identifier 400 to a different value. For example, in the implementation illustrated in FIG. 4A, the hash algorithm 402 includes three hash functions which map each identifier 400 to a different value in a result 404, resulting in three "hits" within the result array for each identifier 400. Different numbers of hash functions may be used, or, in some implementations, the hash functions may be the same function, but with different hash salt or data added to the identifier 400 for hashing. Accordingly, the combined data structure 408 includes an identifier for each result of the hash functions for each identifier 400. As shown, in many implementations, the data structure may comprise a string of bits with a bit set to a predetermined value (e.g. 0 or 1) if a hash function of an identifier 400 outputs the corresponding array position. In other implementations, the data structure may comprise an array of values or other data, with distinctions between array positions matching hash function results and those not matching hash function results.

Figure 4B:
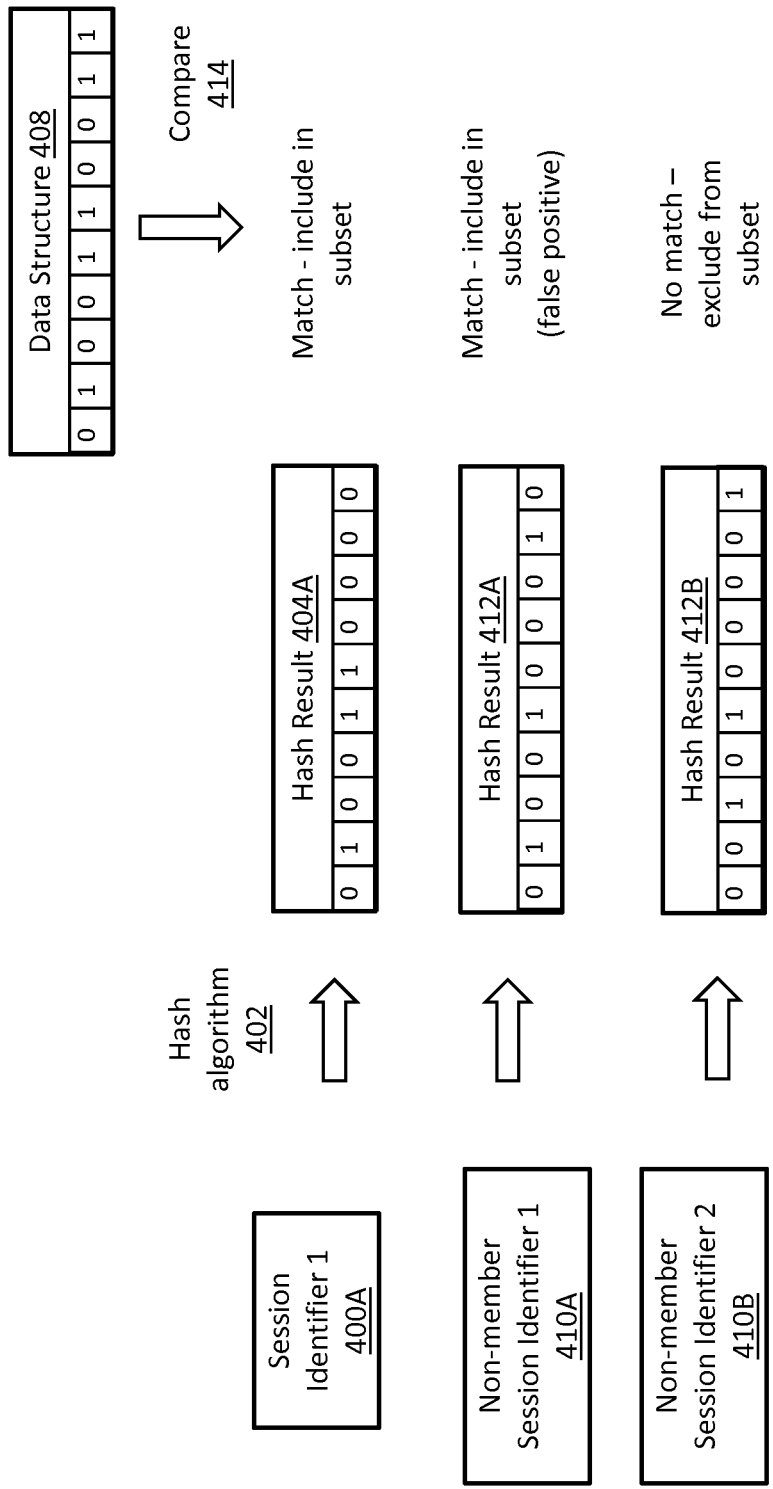
FIG. 4B is a diagram of an example of use of a probabilistic data structure for filtering audience measurement data, according to one implementation.

FIG. 4B is a diagram of an example of use of a probabilistic data structure for filtering audience measurement data, according to one implementation. An audience measurement server may have a database of measurement data including a plurality of cookies, device identifiers, or session identifiers of panel participants 400 (e.g. session identifier 1 400A). Similarly, the database may also include measurement data including cookies, device identifiers, or session identifiers of non-panel participants 410 (e.g. non-member session identifiers 1 410A and 2 410B), referred to generally as non-member identifiers 410. The measurement server may apply the hash algorithm 402 to each identifier 400, 410, to generate corresponding hash results 404 of panel participant identifiers 400, and hash results 412 of non-member identifiers 410 (e.g. hash results 412A-412B).

Upon receipt of the probabilistic data structure 408 from a panel provider, the audience measurement server may compare each hash result 404, 412 to the data structure 408 at step 414. If every identified array position in a hash result 404, 412 is included in the data structure 408, then the corresponding identifier 400, 410 (and corresponding content identifier or identifiers) may be included in a subset of the data to be provided to the panel provider. However, if any of the identified array positions in a hash result 412 is not included in the data structure 408, then the corresponding identifier 410 must be of a device that is definitely not a member of the panel: if it were, then the hash functions could only result positions that are identified in data structure 408. Accordingly, by comparing the data structure 408 to hash results 404, 412, the audience measurement service may extract a subset of the measurement data that includes data from all panel members, plus data from a random portion of non-panel members, without the audience measurement service being able to determine which members are in the panel and which are not.

As discussed above, once a subset of the data is extracted or selected to be provided to a panel provider, each content identifier or item of data may be encrypted with its corresponding session identifier, device identifier, or cookie. The encrypted data may be provided to the panel provider. Because the panel provider will have the session identifiers, device identifiers, or cookies of its panel members, but no such identifiers for non-panel members, the panel provider will only be able to successfully decrypt the content identifiers corresponding to identifiers of panel members. Accordingly, the panel provider may not be able to utilize data corresponding to non-panel participants.

Figure 5:
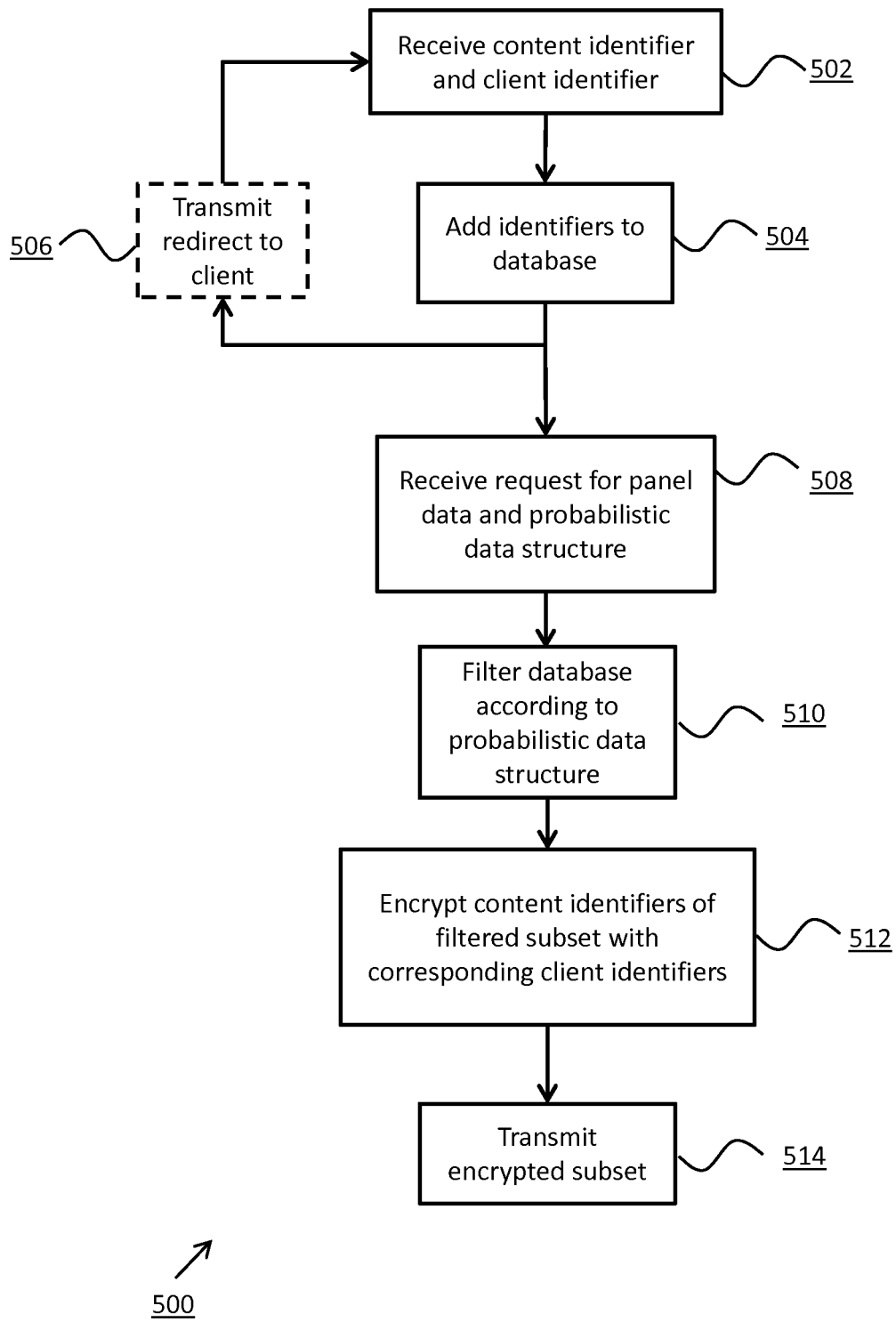
FIG. 5 is a flow diagram of the steps taken in one implementation of a process for audience measurement via an audience measurement server, according to one implementation.

FIG. 5 is a flow diagram of the steps taken in one implementation of a process 500 for audience measurement via an audience measurement server, according to one implementation. At step 502, an audience measurement server may receive a communication from a client device, the communication including a content identifier and a client identifier. As discussed above, the communication may comprise a request for content from the audience measurement server, such as a request for a one pixel by one pixel image, with a content identifier identifying a referrer page, for example. In other implementations, the communication may comprise a request for the content, and the audience measurement server may respond with a redirection to the content provider at step 506, while recording the request as an identification of content that will be delivered to the client device. In other implementations, content identifiers and/or client identifiers may be provided as parameters of a request, in headers of packets, via data structures or application programming interfaces, or any other such methods. As discussed above, client identifiers may include device identifiers, session identifiers, or cookies generated by a panel provider or by the audience measurement server and provided to the client during a registration process. In some implementations, the communication may include other information, such as a referral page, a search query, a time stamp, or any other type and form of information.

At step 504, in some implementations, the audience measurement server may add the identifiers to a measurement database. In some implementations, the database may comprise pairs of content identifiers and client identifiers, while in other implementations, the database may comprise sets of content identifiers corresponding to a client identifier. In such implementations, when new content identifiers are received with previously received client identifiers, they may be added to the sets for said client identifiers. Other information received in the communication may be added to the database, including timestamps, referral pages, search queries, or any other such information.

As shown, in many implementations, steps 502 and 504 may be repeated for a plurality of communications from a client or for a plurality of communications from a plurality of clients. Subsequently, at step 508, the audience measurement server may receive a request for audience data of members of a panel from a panel provider. The request may include a probabilistic data structure, such as a Bloom filter or quotient filter array, calculated from hashes of client identifiers of members of the requested panel, for example, as discussed above in connection with FIGS. 4A-4B.

At step 510, the audience measurement server may filter, select, or extract a subset of the measurement data according to the probabilistic data structure. As discussed above, extracting the data may include comparing a hash of each client identifier in the measurement database to the data structure, and including in the subset client identifiers with hash results included in the data structure, and excluding from the subset client identifiers with hash results not included in the data structure. In some implementations, the hashes may be pre-calculated, for example, at step 504, and stored in the measurement database, or used as index values in the database.

At step 512, the audience measurement server may encrypt each content identifier in the extracted subset with the corresponding client identifier received with the content identifier. The audience measurement server may use any type and form of symmetric encryption in which the client identifier may be both the encryption and decryption key. Although shown after step 510, in some implementations, step 512 may be performed after or with step 504. For example, the audience measurement server may store an encrypted form of each content identifier within the database, potentially reducing the need to encrypt the value repeatedly for different panel data requests.

At step 514, the encrypted subset of the data may be transmitted to the panel provider in response to the request at 508. As discussed above, the subset will include content identifiers corresponding to client identifiers of panel members, as well as some content identifiers corresponding to client identifiers of non-panel members resulting from false positives generated by the filter. As the panel provider will not have these latter client identifiers, the panel provider will only be able to decrypt content identifiers corresponding to its own panel members.

As the above discussed systems and methods do not require installation of a client agent, the audience measurement server may be able to record content identifiers and client identifiers from all viewers of an item of content. For example, the item of content may be provided as an embedded or linked element in a web page, and upon rendering of the page or selecting the link, the client device may transmit a request to the audience measurement server. Accordingly, in such implementations, the audience measurement server may be able to measure the total audience viewing content. In a further implementation, this total audience measurement may be used to verify accuracy of a single-source panel. For example, if the audience measurement server determines that a very large audience is viewing an item of content (for example, a particularly popular viral video), while a single-source panel includes only a very small number of viewers of the content, a statistical prediction of an audience of the content generated from the single-source panel data may be very low. This prediction may be compared to the total measurement data and used to identify that the panel may not represent an accurate sample of the audience population. In a similar implementation, a portion of pings or measurement data received by the audience measurement server from the total audience (e.g. 1%, including both panel and non-panel member data) may be forwarded or redirected to a panel provider, such that the panel provider may compare a statistical measurement of the likely total audience to the predictive measurement from its panel member data.

As discussed above, in many such implementations, the collected data may be anonymized or disambiguated to protect the privacy, particularly for individuals that are not panel participants. In many such implementations or similar situations in which personal information about the user of client device may be collected for measurement or used to select third-party content, the user may be provided with an opportunity to control whether programs or features that may collect personal information (e.g., information about a user's social network, social actions or activities, a user's preferences, or a user's current location) do so, or an opportunity to control whether or how to transmit measurement data to an audience measurement server and/or panel provider. In addition, certain data may be treated in one or more ways before it is stored or used by an audience measurement server, so that personally identifiable information is removed when generating parameters (e.g., demographic parameters). For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by the audience measurement servers, panel providers, and content providers.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A method for secure online audience measurement, comprising:
    receiving, by an audience measurement server comprising a processor, a plurality of communications transmitted from a corresponding plurality of client devices, each of the plurality of communications comprising an identification of an item of content and a device identifier of the corresponding client device;
    receiving from a device, by the audience measurement server, a request for measurement data of members of a panel measurement service, the request comprising a probabilistic data structure including a bitwise-or operation of a hash of each device identifier of a first portion of the plurality of client devices;
    generating, by the audience measurement server, from the received plurality of communications, by applying the bitwise-or operation of the hash of each device identifier in the probabilistic data structure to the device identifiers of each of the plurality of communications, a subset of the received plurality of communications including (i) first communications including a first set of the device identifiers of the first portion of the plurality of client devices operating on behalf of the members of the panel measurement service and (ii) second communications including a second set of the device identifiers of a second portion of the plurality of client devices not corresponding to the members of the panel measurement service;
    generating, by the audience measurement server, encrypted measurement data from the generated subset by encrypting each identification of item of content with its corresponding device identifier in the first and second communications; and
    transmitting to the device, by the audience measurement server, the encrypted measurement data comprising a first portion encrypted using the first set of device identifiers and decryptable by the device using the first set of device identifiers, and a second portion encrypted using the second set of device identifiers and not decryptable by the device using the first set of device identifiers.

2. The method of claim 1, wherein each of the plurality of communications transmitted from a client device of the plurality of client devices is transmitted responsive to the client device receiving the item of content from a content provider.

3. The method of claim 1, wherein the device successfully decrypts identifications of items of content corresponding to device identifiers of the first portion of the plurality of client devices, and fails to decrypt identifications of items of content not corresponding to device identifiers of the first portion of the plurality of client devices.

4. The method of claim 1, wherein the device identifiers of client devices of the first portion of the plurality of client devices are generated by the panel measurement service.

5. The method of claim 1, further comprising:
    receiving a request, by the audience measurement server from a client device of the plurality of client devices, for the device identifier;
    generating, by the audience measurement server, the device identifier; and
    transmitting to the client device, by the audience measurement server, the device identifier, the device identifier provided by the client device to the panel measurement service responsive to the client device operating on behalf of a member of the panel measurement service.

6. The method of claim 1, wherein the probabilistic data structure comprises a Bloom filter.

7. The method of claim 1, wherein the probabilistic data structure comprises a quotient filter.

8. The method of claim 1, wherein generating the subset of the received plurality of communications further comprises:
    determining that a hash of a device identifier of a communication of the plurality of communications matches a portion of the probabilistic data structure; and
    including the communication in the generated subset, responsive to the determination that the hash of the device identifier matches the portion of the probabilistic data structure.

9. The method of claim 1, wherein generating the subset of the received plurality of communications further comprises:

determining that a hash of the device identifier of a communication of the plurality of communications does not match a portion of the probabilistic data structure; and excluding the communication from the generated subset, responsive to the determination that the hash of the device identifier does not match a portion of the probabilistic data structure.

10. A system for secure online audience measurement, comprising:

an audience measurement server in communication with a plurality of client devices, the audience measurement server comprising a processor and a memory including computer-readable instructions that when executed by the processor, causes the processor to perform the steps of:

receiving a plurality of communications transmitted from a corresponding plurality of client devices, each of the plurality of communications comprising an identification of an item of content and a device identifier of the corresponding client device;

receiving, from a device, a request for measurement data of members of a panel measurement service, the request comprising a probabilistic data structure including a bitwise-or operation of a hash of each device identifier of a first portion of the plurality of client devices;

generating, from the received plurality of communications, by applying the bitwise-or operation of the hash of each device identifier in the probabilistic data structure to the device identifiers of each of the plurality of communications, a subset of the received plurality of communications including (i) first communications including a first set of the device identifiers of the first portion of the plurality of client devices operating on behalf of the members of the panel measurement service and (ii) second communications including a second set of the device identifiers of a second portion of the plurality of client devices not corresponding to the members of the panel measurement service;

generating encrypted measurement data from the generated subset by encrypting each identification of item of content with its corresponding device identifier in the first and second communications; and transmitting the encrypted measurement data comprising a first portion encrypted using the first set of device identifiers and decryptable by the device using the first set of device identifiers, and a second portion encrypted using the second set of device identifiers and not decryptable by the device using the first set of device identifiers.

11. The system of claim 10, wherein the device identifiers of client devices of the first portion of the plurality of client devices are generated by the panel measurement service.

12. The system of claim 10, wherein the computer-readable instructions further cause the processor to perform the steps of:

receiving a request, from a client device of the plurality of client devices, for the device identifier;

generating the device identifier; and transmitting, to the client device, the device identifier, the device identifier provided by the client device to the panel measurement service responsive to the device operating on behalf of a member of the panel measurement service.

13. The system of claim 10, wherein the probabilistic data structure comprises a Bloom filter or a quotient filter.

14. The system of claim 10, wherein the computer-readable instructions, when executed by the processor, further cause the processor to perform the steps of:

determining that a hash of the device identifier of a communication of the plurality of communications matches a portion of the probabilistic data structure; and including said communication in the generated subset, responsive to the determination that the hash of the device identifier matches the portion of the probabilistic data structure.

15. The system of claim 10, wherein the computer-readable instructions, when executed by the processor, further cause the processor to perform the steps of:

determining that a hash of the device identifier of a communication of the plurality of communications does not match a portion of the probabilistic data structure; and excluding said communication from the generated subset, responsive to the determination that the hash of the device identifier does not match a portion of the probabilistic data structure.

16. A non-transitory computer-readable storage medium storing instructions that when executed by one or more data processors, cause the one or more data processors to perform operations comprising:

receiving a plurality of communications transmitted from a corresponding plurality of client devices, each of the plurality of communications comprising an identification of an item of content and a device identifier of the corresponding client device;

receiving, from a device, a request for measurement data of members of a panel measurement service, the request comprising a probabilistic data structure including a bitwise-or operation of a hash of each device identifier of a first portion of the plurality of client devices;

generating, from the received plurality of communications, by applying the bitwise-or operation of the hash of each device identifier in the probabilistic data structure to the device identifiers of each of the plurality of communications, a subset of the received plurality of communications including (i) first communications including a first set of the device identifiers of the first portion of the plurality of client devices operating on behalf of the members of the panel measurement service and (ii) second communications including a second set of the device identifiers of a second portion of the plurality of client devices not corresponding to the members of the panel measurement service;

generating encrypted measurement data from the generated subset by encrypting each identification of item of content with its corresponding device identifier in the first and second communications; and transmitting the encrypted measurement data comprising a first portion encrypted using the first set of device identifiers and decryptable by the device using the first set of device identifiers, and a second portion encrypted using the second set of device identifiers and not decryptable by the device using the first set of device identifiers.

* * * * *